United States Patent
Bondesan et al.

(10) Patent No.: US 12,481,865 B2
(45) Date of Patent: Nov. 25, 2025

(54) QUANTUM DEFORMED BINARY NEURAL NETWORKS

(71) Applicant: QUALCOMM Incorporated, San Diego, CA (US)

(72) Inventors: Roberto Bondesan, Amsterdam (NL); Max Welling, Bussum (NL)

(73) Assignee: Qualcomm Incorporated, San Diego, CA (US)

( * ) Notice: Subject to any disclaimer, the term of this patent is extended or adjusted under 35 U.S.C. 154(b) by 1092 days.

(21) Appl. No.: 17/491,426

(22) Filed: Sep. 30, 2021

(65) Prior Publication Data

US 2022/0108154 A1   Apr. 7, 2022

Related U.S. Application Data

(60) Provisional application No. 63/086,463, filed on Oct. 1, 2020.

(51) Int. Cl.
 *G06N 3/047* (2023.01)
 *G06F 18/21* (2023.01)
 *G06N 3/08* (2023.01)
 *G06N 10/00* (2022.01)
 *G06V 10/94* (2022.01)

(52) U.S. Cl.
 CPC .......... *G06N 3/047* (2023.01); *G06F 18/217* (2023.01); *G06N 3/08* (2013.01); *G06N 10/00* (2019.01); *G06V 10/95* (2022.01)

(58) Field of Classification Search
 CPC .............................. G06N 3/047; G06N 10/00
 See application file for complete search history.

(56) References Cited

U.S. PATENT DOCUMENTS 12,175,632 B2 * 12/2024 Gao ................. G06V 10/82

OTHER PUBLICATIONS

Schuld, Maria, et al. "Simulating a Perceptron on a Quantum Computer." Physics Letters A, vol. 379, No. 7, Mar. 2015, pp. 660-663. Crossref, https://doi.org/10.1016/j.physleta.2014.11.061. (Year: 2015).*
International Search Report and Written Opinion—PCT/US2021/053226—ISA/EPO—Feb. 11, 2022.
Peters J.W.T., et al., "Probabilistic Binary Neural Networks", ICLR 2019 Conference, pp. 1-10, arXiv:1809.03368v1 [cs.LG], arxiv.org, Cornell University Library, 201 OLIN Library Cornell University Ithaca, NY 14853, Sep. 10, 2018 (Sep. 10, 2018), XP080915555, p. 1-p. 7.
Schuld M., et al., "Simulating a Perceptron on a Quantum Computer", arxiv.org, Cornell University Library, 201 OLIN Library Cornell University Ithaca, NY 14853, Dec. 11, 2014 (Dec. 11, 2014), XP080783904, 12 Pages, DOI: 10.1016/J.PHYSLETA.2014.11.061 p. 1-p. 9.

* cited by examiner

*Primary Examiner* — Omar F Fernandez Rivas
*Assistant Examiner* — Corey M Sackalosky
(74) *Attorney, Agent, or Firm* — Patterson & Sheridan LLP

(57) ABSTRACT

Certain aspects of the present disclosure provide techniques for processing data in a quantum deformed binary neural network, including: determining an input state for a layer of the quantum deformed binary neural network; computing a mean and variance for one or more observables in the layer; and returning an output activation probability based on the mean and variance for the one or more observables in the layer.

16 Claims, 7 Drawing Sheets

---

400

402 → 1. Replace classical Hamiltonian with more general one $$H_{cl} = \sum_{j=1}^{n} W_j X_j = \begin{pmatrix} 3 & & 0 \\ & 1 & \\ & & -1 \\ 0 & & -3 \end{pmatrix} \longrightarrow H = \begin{pmatrix} 3 & & 0 \\ & 1 & \\ & & -1 \\ 0 & & -3 \end{pmatrix} + t \begin{pmatrix} * & \circledast \\ & * \\ \circledast & * \end{pmatrix}$$

404 → 2. Apply quantum phase estimation $$e^{i\varphi\lambda} = \text{spec}(e^{iH})$$

sgn($\varphi_\lambda$) > 0 — 409
— 408
sgn($\varphi_\lambda$) < 0

406 → 3. Output $p(y) = \sum_\lambda |\langle\lambda|\psi\rangle|^2 \delta(\text{sgn}(\varphi_\lambda) - y)$

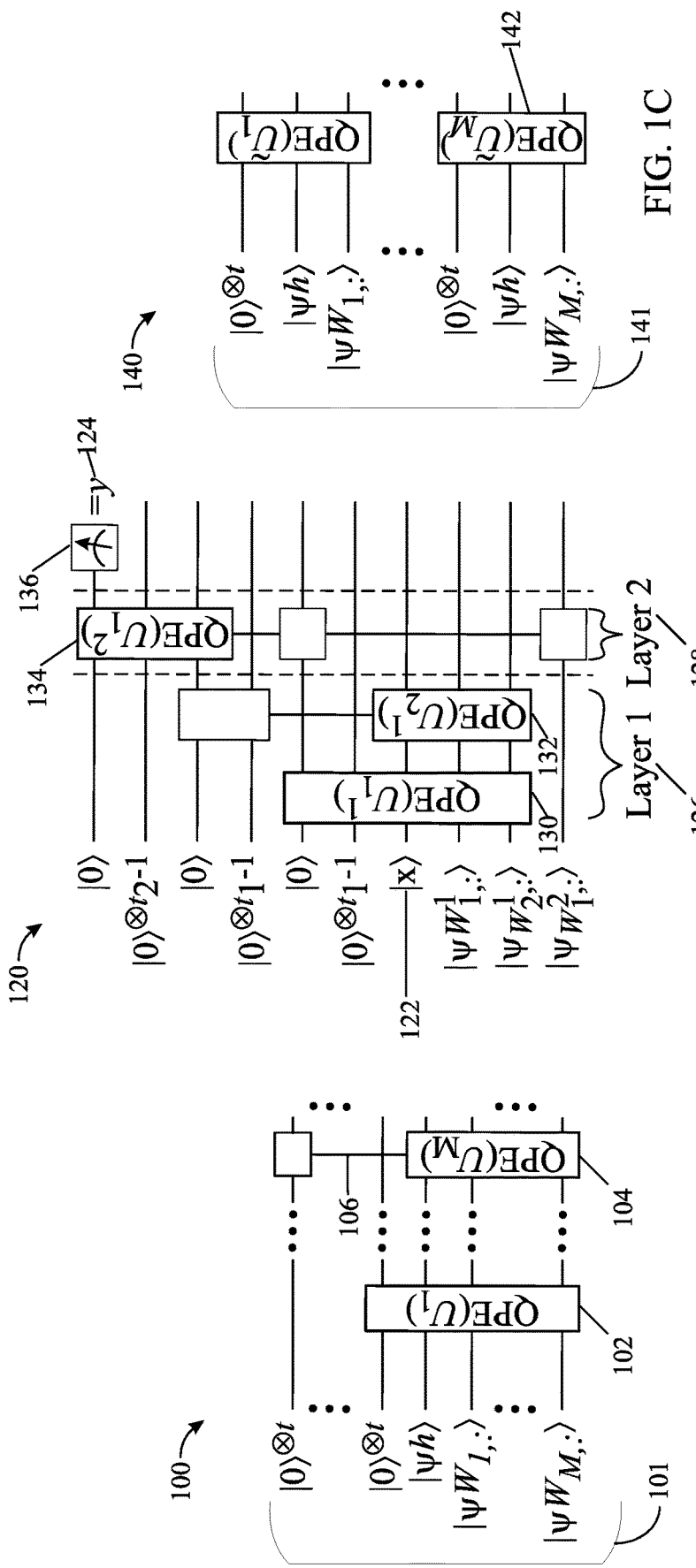

QUANTUM DEFORMED BINARY NEURAL NETWORKS

CROSS-REFERENCE TO RELATED APPLICATIONS

This application claims the benefit of and priority to U.S. Provisional Patent Application No. 63/086,463, filed on Oct. 1, 2020, the entire content of which is hereby incorporated by reference.

INTRODUCTION

Aspects of the present disclosure relate to quantum deformed binary neural networks.

Quantum mechanics is the most accurate description for physical phenomena at very small scales, such as the behavior of molecules, atoms, and subatomic particles. Thus, while the quantum context seems disconnected from everyday life, quantum mechanics in fact affects a myriad of everyday processes and apparatuses, such as lasers, transistors (and thus microchips), magnetic resonance machines (MRIs), and more.

A recent view of quantum mechanics has formulated it as a Bayesian statistical methodology that only describes a subjective view of the quantum world, and how that view may be updated in light of evidence (e.g., measurements). This is a perfect analogy to the classical Bayesian view, a statistical paradigm extensively used in artificial intelligence where probabilities may be used to represent beliefs regarding events in the world.

If quantum mechanics can be viewed as just another consistent statistical theory that happens to describe nature at small scales, then this theory can also be used to describe classical signals by endowing them with a Hilbert space structure. In some sense, the only difference with Bayesian statistics is that the positive probabilities are replaced with complex amplitudes. This has the dramatic effect that, unlike in classical statistics, interference between events now becomes a possibility. This point of view uncovers new architectures and potential speedups for running neural networks on quantum computers.

However, conventional quantum simulation of classical neural network architecture, such as binary neural networks, is structurally limited. In particular, the quantum simulation of a classical neural network layer has a constrained number of learnable parameters and thus the expressivity of such approaches is also limited.

Accordingly, what is needed are methods for extending quantum simulations of classical neural network architectures to more fully leverage inherent aspects of quantum mechanics, such as entanglement.

BRIEF SUMMARY

Certain aspects provide a method for training a quantum deformed binary neural network, comprising: providing input data to a quantum deformed binary neural network; receiving output data from the quantum deformed binary neural network, wherein the output data comprises a plurality of class probabilities; calculating a loss based on the plurality of class probabilities and a known class of the input data; and optimizing a plurality of quantum weights based on the loss.

Further aspects provide a method for processing data in a quantum deformed binary neural network, comprising: determining an input state for a layer of the quantum deformed binary neural network; computing a mean and variance for one or more observables in the layer; and returning an output activation probability based on the mean and variance for the one or more observables in the layer.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 1A depicts an example of a quantum circuit implementing a quantum deformed layer.

FIG. 1B depicts an example quantum deformed multi-layer perceptron.

FIG. 1C depicts an example modification to a quantum circuit for classical simulations.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 2A:
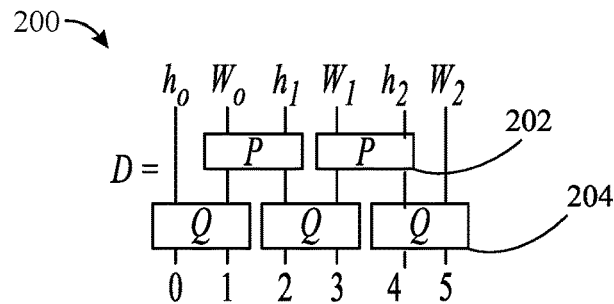
FIG. 2A depicts an example quantum entangling circuit.

Aspects of the present disclosure provide apparatuses, methods, processing systems, and non-transitory computer-readable mediums for training and using quantum deformed binary neural networks.

Embodiments described herein introduce a new class of quantum neural networks, which may be referred to as quantum deformed binary neural networks, and interpret them as generalizations of probabilistic binary neural networks. Further aspects relate to methods for using classically efficient algorithms to train quantum deformed binary neural networks on a set of quantum circuits. Contrary to almost all other works on quantum deep learning, the quantum deformed neural networks described herein can be simulated for practical classical problems, such as classification based on image or sound input data. The quantum nature of the models described herein therefore increases the flexibility of the class of quantum neural networks. Moreover, testing of quantum deformed binary neural networks on real world data shows beneficial gains in accuracy due to the quantum deformations.

Generalized Probabilistic Binary Neural Networks

Binary neural networks are neural networks where both weights and activations are binary. Let $\mathbb{B} = \{0,1\}$. A fully connected binary neural network layer maps the $N_\ell$ activations $h^{(\ell)}$ at level $\ell$ to the $N_{\ell+1}$ activations $h^{(\ell+1)}$ at level $\ell+1$ using weights $W^{(\ell)} \in \mathbb{B}^{N_\ell N_{\ell+1}}$ according to:

$$h_j^{(\ell+1)} = f(W^{(\ell)}, h^{(\ell)}) = \sigma\left(\frac{1}{N_\ell + 1}\sum_{i=1}^{N_\ell} W_{j,i}^{(\ell)} h_i^{(\ell)}\right), \sigma(x) = \begin{cases} 0 & x < \frac{1}{2} \\ 1 & x \geq \frac{1}{2} \end{cases} \quad (1)$$

Here, $N_\ell + 1$ is used as a divisor because the sum can take the $N_\ell + 1$ values $\{0, \ldots, N\}$. Biases are not explicitly considered, but in some aspects, biases can be introduced by fixing some activations to 1.

A classification model may thus be considered where $h^{(0)} = x$ is the input and the last activation function is replaced by a softmax, which produces output probabilities $p(y|x, W)$. W denotes the collection of weights of the network.

Given M input/output pairs $X = (x^1, \ldots, x^M)$, $Y = (y^1, \ldots, y^M)$, a frequentist approach would determine the binary weight so that the likelihood:

$$P(Y|X, W) = \prod_{i=1}^{M} p(y_i|x_i, W)$$

is maximized. Herein, discrete or quantized weights are considered and a variational optimization approach is used, which introduces a weight distribution to devise surrogate differential objectives in discrete optimization problems. For an objective O(W), one has the bound $max_{W \in \mathbb{B}^N} O(W) \geq \mathbb{E}_{q_\theta(W)}[O(W)]$. Then, a distribution $q_\theta(W)$ is introduced whose parameters are adjusted to maximize the lower bound and consider the objective:

$$\max_{W \in \mathbb{B}^N} \log p(Y|X, W) \geq \mathbb{E}_{q_\theta(W)}[\log p(Y|X, W)] = \quad (2)$$

$$\sum_{i=1}^{M} \log p(y_i|x_i, W) =: \mathcal{L}$$

To uncouple the data terms as in the last equality, different $W_i$ may be introduced for each data-case and an integral may be taken over $\prod_i q(W_i)$, where the distributions q are all the same. While the optimal solution to Equation 2 is a Dirac measure, a regularization term $R(\theta)$ may be added to keep q soft.

In both variational Bayes and variational optimization frameworks for binary networks, there are probabilistic layers where activations are random variables and a variational distribution q(W). An approximate posterior factorized over the layers may be considered according to: $q(W) = \prod_{\ell=1}^{L} q^{(\ell)}(W^{(\ell)})$. If $h^{(\ell)} \sim p^{(\ell)}$, where Equation 1 leads to the following recursive definition of distributions:

$$p^{(\ell+1)}(h^{(\ell+1)}) = \sum_{h \in \mathbb{B}^{N_\ell}} \sum_{W \in \mathbb{B}^{N_\ell N_{\ell+1}}} \quad (3)$$

$$\delta(h^{(\ell+1)} - f(W^{(\ell)}, h^{(\ell)})) p^{(\ell)}(h^{(\ell)}) q^{(\ell)}(W^{(\ell)})$$

The prediction q(y|x) can be identified with the distribution after L steps as $p(y|x) = p^{(L)}(y)$.

In previous works, the approximate posterior was taken to be factorized according to: $q(W^{(\ell)}) = \prod_{ij} q_{i,j}(W_{i,j}^{(\ell)})$, which results in a factorized activation distribution as well: $p(h^{(\ell)}) = \prod_i p_i(h_i^{(\ell)})$.

The quantum neural network introduced herein naturally give a way to sample efficiently from complex distributions. In view of this, the setting may be generalized by utilizing a stochastic matrix $S_\phi(h', W'|h, W)$, which depends on parameters $\phi$ and correlates the weights and the input activations to a layer as follows:

$$\pi_{\phi,\theta}(h', W') = \sum_{h \in \mathbb{B}^N} \sum_{W \in \mathbb{B}^{NM}} S_\phi(h', W'|h, W) p(h) q_\theta(W) \quad (4)$$

To avoid redundancy, $q_\theta(W)$ can still be taken to be factorized, and S can create correlation among the weights as well. The choice of S will be related to the choice of a unitary matrix in a quantum circuit of the quantum neural network. Thus, a layer is now made of the two operations, $S_\phi$ and the layer map $f$, resulting in the following output distribution:

$$p^{(\ell+1)}(h^{(\ell+1)}) = \sum_{h \in \mathbb{B}_\ell^N} \sum_{W \in \mathbb{B}^{N_\ell N_{\ell+1}}} \delta(h^{(\ell+1)} - f(W^{(\ell)}, h^{(\ell)})) \pi_{\phi,\theta}^{(\ell)}(h^{(\ell)}, W^{(\ell)}), \quad (5)$$

which allows for computing the network output q(y|x) recursively. Both the parameters $\phi$ and $\theta$ may be learned as well to solve the following optimization problem:

$$\min_{\theta,\phi} R(\theta) + R'(\phi) - \mathcal{L}. \quad (6)$$

While embodiments described herein focus on $\mathcal{L} = \log \mathbb{E}_{q_\theta(W)}[p(Y|X, W)]$, other embodiments may consider $\mathcal{L} = \mathbb{E}_{q_\theta(W)}[\log p(Y|X, W)]$ and apply this framework to Bayesian deep learning. $R(\theta)$ and $R'(\phi)$ are regularization terms for the parameters $\theta$, $\phi$. The resulting model may thus be defined a generalized binary neural network, with $\phi$ deformation parameters chosen such that $\phi=0$ gives back the standard probabilistic binary neural network.

To study this model on a classical computer, S may be chosen to lead to an efficient sampling algorithm for $\pi_{\phi,\theta}$. In general, Markov Chain Monte Carlo could be used, but there exists situations for which the mixing time of the chain grows exponentially in the size of the problem. Instead, embodiments described herein use quantum mechanics to enlarge the set of probabilistic binary neural networks that can be efficiently considered.

Quantum Implementation

Embodiments described herein devise a quantum circuit that implements the generalized probabilistic binary neural networks introduced above, encoding $\pi_{\phi,\theta}$ in a quantum circuit.

In quantum mechanics, the state of a system at a given time may be described by a complex wave function, which may also be referred to as state vector in a complex vector space. In particular, states in quantum mechanics may be represented as abstract vectors in a Hilbert space H and denoted as $|\psi\rangle$, where a Hilbert space is an abstract vector space possessing the structure of an inner product that allows length and angle to be measured.

In various examples described herein, quantum bits (or "qubits") have two possible z-basis states, $|0\rangle$ and $|1\rangle$. These states may generally be defined relative to a particular frame of reference, such as spin values measured along a z-axis. A pure qubit state is a coherent superposition of the basis states. This means that a single qubit can be described by a linear combination of $|0\rangle$ and $|1\rangle$. More generally, a qubit may be described as a complex linear combination (or superposition) of up and down z-spins: $|\psi\rangle = \alpha|0\rangle + \beta|1\rangle$ where $\alpha$ and $\beta$ are probability amplitudes, which may be expressed as general and complex numbers.

Generally, N disentangled qubits may be described as a product state according to: $|\psi\rangle = \Pi_{i=1}^{N}|\psi_i\rangle$. Qubits entangle with each other when interacting (known as decoherence), and the resulting wave function becomes a complex linear combination of an exponential number of $2^N$ terms. This can be written as $|\psi'\rangle = U|\psi\rangle$, where U is a unitary matrix in a $2^N \times 2^N$ dimensional space. This entangled state is still "pure" in the sense that there is nothing more to learn about it, i.e., its entropy is zero and it represents maximal information about the system. However, in quantum mechanics, that does not mean knowledge of the system is complete.

Time evolution in quantum mechanics may be described by a unitary transformation, such as: $|\psi\rangle = U(t, 0)|\psi(0)\rangle$ with $U(t, 0) = e^{iHt}$, where H is the Hamiltonian, a Hermitian operator. Time evolution entangles qubits, and can be used to map an input state to an output state as a layer in a neural network. To incorporate symmetry into this map, such as translational symmetry, this unitary transformation can be required to have a special structure consistent with the commutator relation according to $[H, T] = HT - TH = 0$. Note that this definition is consistent with the definition of equivariance, namely: first evolving and then transforming, $TU(t, 0)|\psi\rangle$, should be the same as first transforming and then evolving, $U(t, 0)T|\psi\rangle$.

Measurements in quantum mechanics may be accomplished by projecting a state onto the eigenbasis of a symmetric positive definite operator A. The quantum system collapses into a particular state with a probability given by Born's rule, namely that the probability $p_i = |\langle \phi_i|\psi\rangle|^2$ where $\{|\phi_i\rangle\}$ are the orthonormal eigenvectors of A. A special case of this is a deterministic projection onto the special state $|0\rangle$, which is also known as the "vacuum state".

A mixed state in quantum mechanics is a mixture of a number of pure quantum states. Probabilities in this mixture encode uncertainty about what quantum state the system is in. This is different from the uncertainty about the outcome of a quantum measurement of a pure state, which cannot be resolved by learning more about the system. Knowledge about a pure state is maximal, but not complete, and knowledge about a mixed state is not even maximal.

Mixed states are not naturally described by wave vectors. For that, a density matrix $\rho$ may be used. For a pure state, a rank 1 matrix (or outer product) may be used, such as: $\rho = |\omega\rangle\langle\psi|$. But for a mixed state, the rank will be higher and $\rho$ can be decomposed as $\rho = \Sigma_k p_k |\psi_k\rangle\langle\psi_k|$. Note that a unitary transformation will change the basis, but not the rank, and hence will keep pure states pure. Thus, it follows that the Rank($\rho'$) = Rank($U\rho U^\dagger$). Further, time evolution will preserve rank and keep a pure state pure.

A qubit may be represented as a normalized vector $\psi \in \mathbb{C}^2$. In such a representation, N qubits form the vector space $(\mathbb{C}^2)^{\otimes N} = \mathbb{C}^{2^N}$ spanned by all N-bit strings, $|b_1, \ldots, b_N\rangle \equiv |b_1\rangle \otimes \ldots \otimes |b_N\rangle$, $b_i \in \mathbb{B}$. Quantum circuits are unitary operators on this space. The probability of a measurement with outcome $\phi_i$ is given by matrix element of the projector $|\phi_i\rangle\langle\phi_i|$ in a state $|\psi\rangle$, namely $p_i = \langle\psi|\phi_i\rangle\langle\phi_i|\psi\rangle = |\langle\phi_i|\psi\rangle|^2$, a formula known as Born's rule.

Finally, similar to marginalization in classical probability theory, degrees of freedom that are not of interest can be traced over, i.e., $\rho_a = Tr_b(\rho_{ab})$. In a twist of quantum logic, when the full density matrix represents a pure entangled quantum system with zero entropy, the reduced density matrix represents a mixed state with non-zero entropy. Thus quantum uncertainty can become classical uncertainty by simply choosing to ignore part of the Hilbert space. Also, in this case $S_a \geq S_{a+b}$, which is not possible for classical entropy because the total Shannon entropy can never be lower than the entropy of any of its parts.

Quantum phase estimation (QPE) is a quantum algorithm to estimate the eigenphases of a unitary U. The eigenvalues and eigenvectors of U may be denoted by exp $$\left(\frac{2\pi i}{2^t}\varphi_\alpha\right)$$

and $|v_\alpha\rangle$, respectively, and it is assumed that the $\varphi_\alpha$'s can be represented with a finite number t of bits: $\varphi_\alpha = 2^{t-1}\varphi_\alpha^1 + \ldots + 2^0\varphi_\alpha^t$, where t ancilla qubits may be introduced in state $|0\rangle^{\otimes t}$. Given an input state $|\psi\rangle$, QPE is the following unitary:

$$|0\rangle^{\otimes t} \otimes |\psi\rangle \stackrel{QPE}{\longmapsto} \Sigma_\alpha \langle v_\alpha | \psi \rangle | \varphi_\alpha \rangle \otimes v_\alpha \rangle \qquad (7)$$

A quantum circuit implementing this map has complexity that is linear in t. Using the notation $\sigma$ for the threshold nonlinearity introduced in Equation 1, and recalling the expansion $2^{-t}\varphi = 2^{-1}\varphi^1 + \ldots + 2^{-t}\varphi^t$ it may be noted that if the first bit $\varphi^1 = 0$ then $2^{-t}\varphi < 1/2$ and $\sigma(2^{-t}\varphi) = 0$, while if $\varphi^1 = 1$, then $2^{-t}\varphi \geq 1/2$ and $\sigma(2^{-t}\varphi) = 1$. In other words, $\delta_{\varphi^1, b} = \delta_{\sigma(\sigma(2^{-t}\varphi), b}$ and the probability that the first ancilla bit is b is given by:

$$p(b) = \left[\sum_\alpha \overline{\langle v_\alpha | \psi \rangle} \langle \varphi_\alpha | \otimes \langle v_\alpha | \right] \prod_{1,b} [\Sigma_\beta \langle v_\beta | \psi \rangle | \varphi_\beta \rangle \otimes | v_\beta \rangle] = \qquad (8)$$

$$\Sigma_\alpha |\langle v_\alpha | \psi \rangle|^2 \delta_{\sigma(2^{-t}\varphi_\alpha), b},$$

where $\Pi_{1,b} = |b\rangle\langle b| \otimes 1$ is an operator that projects the first bit to the state $|b\rangle\langle$ and leaves the other bits untouched.

Definition and Advantages of Quantum Deformed Neural Networks

Quantum phase estimation may be applied to compute the output of the probabilistic layer of Equation 5. Let N be the number of input neurons and M that of output neurons. Then, qubits may be introduced to represent inputs and weights bits as follows:

$$|h, W\rangle \in V_H \otimes V_W, \quad V_H = \bigotimes_{i=1}^{N}(\mathbb{C}^2)_i, \quad V_W = \bigotimes_{i=1}^{N}\bigotimes_{j=1}^{M}(\mathbb{C}^2)_{ij} \qquad (9)$$

Then a Hamiltonian $H_j$ may be introduced, which acts non-trivially only on the N input activations and the N weights at the j-th row:

$$H_j = \sum_{i=1}^{N} B_{ji}^{W} B_i^{H}, \tag{10}$$

where $B_i^H$ ($B_{ji}^W$) is the matrix $B=|1\rangle\langle 1|$ acting on the i-th activation (ji-th weight) qubit. Note that $H_j$ singles out terms from the state $|h, W\rangle$ where both $h_j=1$ and $W_{ij}=1$ and then adds them up, i.e. the eigenvalues of $H_j$ are the preactivations of Equation 1:

$$H_j|h,W\rangle = \varphi(h, W_{j,:})|h,W\rangle, \varphi(h, W_{j,:}) = \sum_{i=1}^{N} W_{ji} h_i. \tag{11}$$

Now, the unitary operators and the states may be defined as:

$$U_j = D e^{\frac{2\pi i}{N+1} H_j} D^{-1}, \tag{12}$$

where D is another generic unitary, and its eigenvectors are related to the entries of the classical stochastic matrix S, described above. Since $$U_j U_{j'} = D e^{\frac{2\pi i}{N+1}(H_j + H_{j'})} D^{-1} = U_{j'} U_j,$$

all the $U_j$'s may be diagonalized simultaneously, and since they are conjugate to $$e^{\frac{2\pi i}{N+1} H_j},$$

they will have the same eigenvalues. Given the eigenbasis $|h, W\rangle_D = Dh, W$, there is:

$$U_j|h, W\rangle_D = e^{\frac{2\pi i}{N+1} \varphi(h, W_{j,:})} |h, W\rangle_D. \tag{13}$$

Note that $\varphi \in \{0, \ldots, N\}$, so it can be represented with exactly t bits, $N = 2^t - 1$. Then, M ancilla resources may be added, each of t qubits, and a quantum circuit can be constructed that sequentially performs M quantum phase estimation for each $U_j$. The following input state may be chosen:

$$|\psi\rangle = |\psi\rangle_H \otimes \bigotimes_{j=1}^{M} |\psi\rangle_{w_{j,:}}, \tag{14}$$

$$|\psi\rangle_{w_{j,:}} = \bigotimes_{i=1}^{N} [\sqrt{q_{ji}(W_{ji}=0)}|0\rangle + \sqrt{q_{ji}(W_{ji}=1)}|1\rangle],$$

where the weight input state is chosen according to the factorized variational distribution $q_{ij}$ introduced above. In fact, this state can be converted to a probability distribution via Born's rule according to:

$$p(h,W) = |\langle h, W|\psi\rangle|^2 = p(h) \prod_{j=1}^{M} \prod_{i=1}^{N} q_{ji}(W_{ji}), p(h) = |\langle h|\psi\rangle_h|^2. \tag{15}$$

A non-trivial choice of D leads to an effective correlated distribution. The jth quantum phase estimation corresponds to Equation 7, where $|v_\alpha\rangle \equiv |h, W_D\rangle$, $|\varphi_\alpha\rangle \equiv |\varphi(h, W_{j,:})\rangle$ are identified and the j-th block of t ancillas is used. After M steps, the outcome probability of a measurement of the first qubit in each of the M registers of the ancillas is computed. Equation 8 can be extended to the situation of measuring multiple qubits, and recalling that the first bit of an integer is the most significant bit, determining whether $2^{-t}\varphi(h, W_{j,:}) = (N+1)^{-1}\varphi(h, W_{j,:})$ is greater or smaller than ½, the probability of outcome $h' = (h'_1, \ldots, h'_{M'})$ is:

$$P(h') = \sum_{h \in \mathbb{B}^N} \sum_{W \in \mathbb{B}^{NM}} \delta_{h', f(w,h)} |\langle \omega|h, W\rangle_D|^2 \tag{16}$$

where $f$ is the layer function introduced in Equation 1. Equation 16 is the generalized probabilistic binary layer introduced in Equation 5, where D corresponds to a non-trivial S and correlated distributions when D entangles the qubits:

$$\pi(h, W) = |\langle \psi|D|h, W\rangle|^2 \tag{17}$$

The variational parameters $\phi$ of S are now parameters of the quantum circuit D. Sampling from $\pi$ can be done by doing repeated measurements of the first M ancilla qubits of this quantum circuit. On quantum hardware $$e^{\frac{2\pi i}{N+1} H_j}$$

can be efficiently implemented since it is a product of diagonal two-qubits quantum gates. Unitaries D can be considered, which have efficient quantum circuit approximations. Then, computing the probabilistic binary layer output on a quantum computer is going to take time $O(tMu(N))$ where $u(N)$ is the time it takes to compute the action of $U_j$ on an input state. There exists D such that sampling from Equation 17 is exponentially harder classically than quantum mechanically, a statement forming the basis for quantum supremacy experiments. Examples are random circuits with two-dimensional entanglement patterns, which from a machine learning point of view, can be natural when considering image data. Other examples are D implementing time evolution operators of physical systems, whose simulation is exponentially hard classically, resulting in hardness of sampling from the time evolved wave function.

Regarding the preparation of $\psi_H$, at the first layer, the input can be prepared by encoding the input bits in the state $|x\rangle$. For the next layers, the output state can be used as the input to the next layer.

Note that the qubits associated to intermediate activations are entangled with the other wires. Therefore the input state $\psi_H$ would have to be replaced by a state in $V_H$ and the environment, where the gates at next layer would act only on $V_H$ in the manner described above. An equivalent and more economical mathematical description is to replace $\psi_H$ with the reduced density matrix $\rho_H$.

Other procedures are possible after the first layer. For example, sampling from Equation 16 and initialize $\psi_H$ to the bit string sampled may be performed analogous to the classical quantization of activations. As another example, sampling can be performed many times to reconstruct the classical distribution and encode it in $\psi_H$. The second example is used for the classical simulations discussed below, which is efficient because the output distribution is factorized.

FIG. 1A depicts a quantum circuit 100 implementing a quantum deformed layer. Quantum circuit 100 includes input and weight lines 101 that are connected with unitary gates 102 through 104. Note that the thin vertical line 106 indicates that the gate acts as identity on the wires crossed by the line.

FIG. 1B depicts an example quantum deformed multilayer perceptron 120 with 2 hidden quantum neurons and 1 output quantum neuron. |x⟩ is an encoding of the input signal 122, y is the prediction 124. The superscript 1 in $U_j^l$ and $W_j^l$ refers to layer 1. For example, in the exemplary quantum deformed multilayer perceptron 120, there is a first layer 126 and a second layer 128. In the exemplary quantum deformed multilayer perceptron 120, there is a first quantum phase estimation 130 and a second quantum phase estimation 132 in the first layer 126, and a first quantum phase estimation 134 in the second layer 126. The blocks of $t_l$ ancilla qubits may be split into a readout qubit 136 that encodes the layer output amplitude and the rest.

Modifications for Classical Simulations

The following provides classical simulations of the quantum neural networks introduced above for a restricted class of designs.

In this example, the input activation registers are cloned M times, an operation that quantum mechanically is only approximate, but exact classically. Then the j-th copy is associated with the j-th row of the weight matrix, thus forming pairs for each j=1, . . . , M according to:

$$|h, W_{j,:}\rangle \in V_H \otimes V_{W,j}, V_{W,j} = \bigotimes_{i=1}^{N} (\mathbb{C}^2)_{ji} \tag{18}$$

Fixing j, the unitary $$e^{\frac{2\pi i}{N+1} H_j}$$

diagonal is introduced in the basis $|h, W_{j,:}\rangle$ as in Equation 10, and a new unitary is defined according to:

$$\tilde{U}_j = D_j e^{\frac{2\pi i}{N+1} H_j} D_j^{-1}, \tag{19}$$

where, with respect to Equation 12, $D_j$ depends on j. The eigenvectors of $\tilde{U}_j$ are denoted by $|h, W_{j,:}\rangle_{D_j} = D_j |h, W_{j,:}\rangle$ and the eigenvalues are $\varphi(h, W_{j,:})$, which were introduced in Equation 11. Then, the quantum phase estimation is applied to $\tilde{U}_j$ with inputs:

$$|\psi_j\rangle = |\psi_H\rangle \otimes |\psi\rangle_{W_{j,:}}, |\psi_H\rangle = \bigotimes_{i=1}^{N} [\sqrt{p_i(h_i=0)}|0\rangle + \sqrt{p_i(h_i=1)}|1\rangle], \tag{20}$$

and $|\psi\rangle_{W_{j,:}}$ is defined in Equation 15.

Going through similar calculations as those done above shows that measurements of the first qubit will be governed by the probability distribution of Equation 5 factorized over output channels since the procedure does not couple them: $\phi(h, W) = \prod_{j=1}^{M} |\langle \psi_j | D_j | h, W_{j,:}\rangle|^2$. The same considerations of quantum advantage for sampling can be applied to the circuits $D_j$.

The preceding example only focuses on fully connected layers, but the derivation may be extended to the convolution case by applying the quantum phase estimation on images patches (also referred to as receptive fields) of the size equal to the kernel size.

In particular, in the case of convolution layers, the eigenphases to be estimated using the quantum phase estimation are:

$$\varphi_{i,j,d} = \sum_{k=1}^{K_1} \sum_{\ell=1}^{K_2} \sum_{c=1}^{C} W_{k,\ell,c,d} h_{i+k,\ell+j,c}.$$

Here, the kernel W has size ($K_1$, $K_2$, C, C'), where $K_1$ ($K_2$) is the kernel along the height (width) direction, while C (C') is the number of input (output) channels and d=1, . . . , C'.

Classically, the convolution can be implemented by extracting patches of size $K_1 \times K_2 \times C$ from the image and perform the dot product of the patches with a flattened kernel for each output channel. Moving on to the quantum implementation discussed in section 3.3, we recall that the input activation distribution is factorized. Therefore it is encoded in a product state, and we define patches analogously to the classical case since there is no entanglement coupling the different patches. The quantum convolutional layer can then be implemented as outlined above in the classical case, replacing the classical dot product with the quantum circuit implementing the fully connected layer of section 3.3. The resulting quantum layer is a translation equivariant quantum channel for any choice of $D_j$.

FIG. 1C depicts an example of modifications of a layer in a quantum circuit 140 for classical simulation. In this example, the inputs and weight lines 141 are repeated for different gates 142.

Classical Simulations for Low Entanglement

When the weight and activation distributions at a given neural network layer are factorized, $p(h)=\prod_i p_i(h_i)$ and $q(W)=\prod_{ij} q_{ij}(W_{ij})$, the output distribution in Equation 3 can be efficiently approximated using the central limit theorem (CLT). For example, for each j the preactivations $\varphi(h, W_{j,:})=\sum_{i=1}^{N} W_{j,i} h_i$ are sums of independent binary random variables $W_{j,i} h_i$ with mean and variance:

$$\mu_{ji} = \mathbb{E}_{w \sim q_{ji}}(w) \mathbb{E}_{h \sim p_i}(h), \sigma_{ji}^2 = \mathbb{E}_{w \sim q_{ji}}(w^2) \mathbb{E}_{h \sim p_i}(h^2) - \mu_{ji}^2 = \mu_{ji}(1-\mu_{ji}), \tag{21}$$

Note that $b^2=b$ for a variable $b \in \{0,1\}$. The central limit theorem implies that for large N, $\varphi(h, W_{j,:})$ can be approximated with a normal distribution with mean $\mu_j = \sum_i \mu_{ji}$ and variance $\sigma_j^2 = \sum_i \sigma_{ji}^2$. The distribution of the activation after the non-linearity of Equation 1 can thus be computed as:

$$p\left(\sigma\left(\frac{1}{N+1}\varphi(h, W_{j,:})\right) = 1\right) = \tag{22}$$

$$p(2\varphi(h, W_{j,:}) - N > 0) = \Phi\left(-\frac{2\mu_j - N}{2\sigma_j}\right),$$

where $\Phi$ is the cumulative distribution function of the standard normal distribution.

Commuting observables (e.g., the Hermitian matrix H) in quantum mechanics behave like classical random variables. The observable of interest for in this case, $DHD^{-1}$, which appears in Equation 19, is a sum of commuting terms $K_i \equiv DB_i^W B_i^H D^{-1}$, and if these terms joint probability distribution is such that these random variables are weakly correlated, i.e. if $$\langle \psi | K_i K_{i'} | \psi \rangle - \langle \psi | K_i | \psi \rangle \langle \psi | K_{i'} | \psi \rangle \to 0, \text{if } |i-i'| \to \infty, \tag{23}$$

then the central limit theorem for weakly correlated random variables applies, stating that measurements of $DHD^{-1}$ in state $|\psi\rangle$ are governed by a Gaussian distribution $N(\mu, \sigma^2)$ with:

$$\mu = \langle \psi | DHD^{-1} | \psi \rangle, \sigma^2 = \langle \psi | DH^2D^{-1} | \psi \rangle - \mu^2. \quad (24)$$

Further, the probability of a measurement of $$\sigma\left(\frac{1}{N+1} DHD^{-1}\right)$$

can be computed by using Equation 22 and plugging in the values of $\mu$ and $\alpha$ from the Equation 24, above.

Thus, the problem of simulating the quantum neural network may be cast to the problem of computing the expectation values in Equation 24. In physical terms, these are related to correlation functions of H after evolving a state $|\psi\rangle$ with the operator D. This can be efficiently done classically for one dimensional and lowly-entangled quantum circuits D. In view of that, consider a 1d arrangement of activation and weight qubits, labeled by i=0, . . . , 2N−1, where the even qubits are associated with activations and the odd are associated with weights. Then:

$$D = \Pi_{i=0}^{N-1} Q_{2i,2i+1} \Pi_{i=0}^{N-1} P_{2i+1,2i+2}, \quad (25)$$

where $Q_{2i,2i+1}$ acts non-trivially on qubits 2i, 2i+1, i.e. onto the i-th activation and i-th weight qubits, while $P_{2i,2i+1}$ on the i-th weight and i+1-th activation qubits.

The following is a computation of the mean and variance of Equation 24 with the choice of Equation 25. Denoting $B_{2i} = B_i^H$, $B_{2i+1} = B_i^W$, there is:

$$K_i = D \frac{1}{N} B_{2i} B_{2i+1} D^{-1} = M_i^{-1} \frac{1}{N} B_{2i} B_{2i+1} M_i, \quad (26)$$

$$M_i = Q_{2i,2i+1} P_{2i-1,2i} P_{2i+1,2i+2}$$

So the random variable associated to $K_i$ will have support only on the four qubits {2i−1, 2i, 2i+1, 2i+2}. Thus $\langle \psi | K_i K_i | \psi \rangle = \langle \psi | K_i | \psi \rangle \langle \psi | K_i | \psi \rangle$ for >|i−i'|>1 and the central limit theorem can be applied. Writing $|\psi\rangle = \otimes_{i=0}^{2N-1} |\psi_i\rangle$, and denoting:

$$\langle X \rangle_{L_{i:i'}} = \langle \psi_i | \ldots \langle \psi_{i'} | X | \psi_i \rangle \ldots | \psi_{i'} \rangle, \quad (27)$$

Then, the mean and variances are:

$$\mu = \sum_{i=0}^{N-1} \mu_i, \mu_i = \begin{cases} \langle K_0 \rangle_{0:2} & i = 0 \\ \langle K_i \rangle_{2i-1:2i+2} & 0 < i < N-1 \\ \langle K_{N-1} \rangle_{2N-3:2N-1} & i = N-1 \end{cases} \quad (28)$$

$$\sigma^2 = \sum_{ij} (\langle \psi | K_i K_j | \psi \rangle - \langle \psi | K_i | \psi \rangle \langle \psi | K_j | \psi \rangle) \quad (47)$$

$$= 2 \sum_{i<j} (\langle \psi | K_i K_j | \psi \rangle - \langle \psi | K_i | \psi \rangle \langle \psi | K_j | \psi \rangle) + \quad (29)$$

$$\sum_{i=0}^{N-1} (\langle \psi | K_i^2 | \psi \rangle - \langle \psi | K_i | \psi \rangle^2)$$

$$= 2 \sum_{i=0}^{N-2} (\gamma_{i,i+1} - \mu_i \mu_{i+1}) + \sum_{i=0}^{N-1} (\mu_i - \mu_i^2) \quad (30)$$

$$\gamma_{i,i+1} = \langle \psi | K_i K_{i+1} | \psi \rangle = \begin{cases} \langle K_0 K_1 \rangle_{0:4} & i = 0 \\ \langle K_i K_{i+1} \rangle_{2i-1:2i+4} & 0 < i < N-2 \\ \langle K_{N-2} K_{N-1} \rangle_{2N-3:2N-1} & i = N-2 \end{cases} \quad (31)$$

Figure 2B:
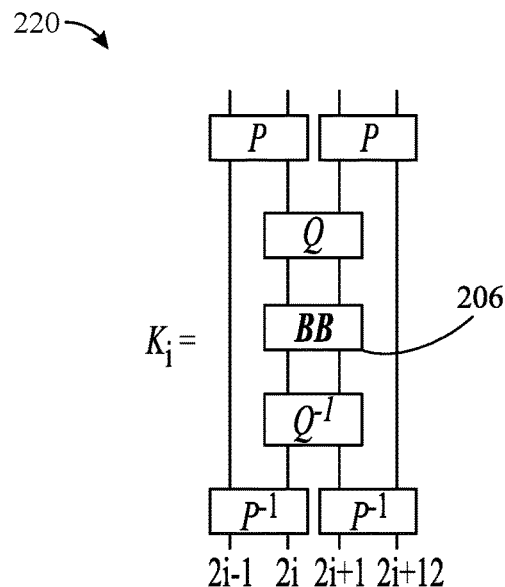
FIG. 2B depicts an example random variable entering the computation of a mean.
Figure 2C:
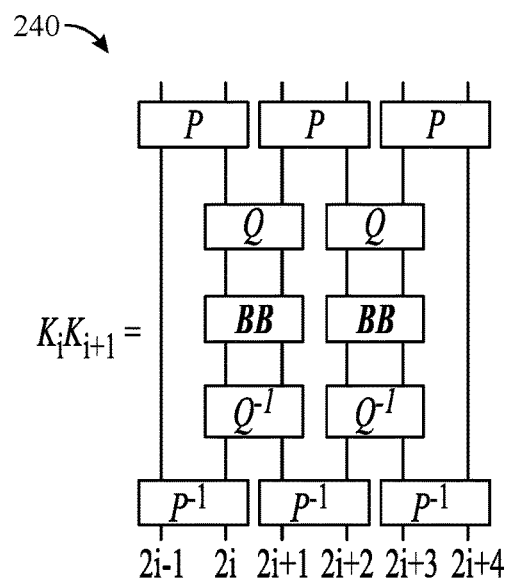
FIG. 2C depicts an example random variable entering the computation of a variance.

An example of this quantum circuit 200 with Qubit gates P 202, Q 204 and BB 206 is depicted in FIG. 2A. Note that the computation of $\mu$ involves the matrix element of $K_i$ in the product state $|\psi\rangle$, while $\sigma^2$ involves that of $K_i K_{i+1}$. Due to the structure of D, these operators act locally on four sites 220 and six sites 240 respectively as depicted in FIGS. 2B-2C. This implies that the computation of Equation 24, and so of the full layer, can be done in O(N) and easily parallelized.

Example Method for Propagating Between Quantum Deformed Layers

Figure 3:
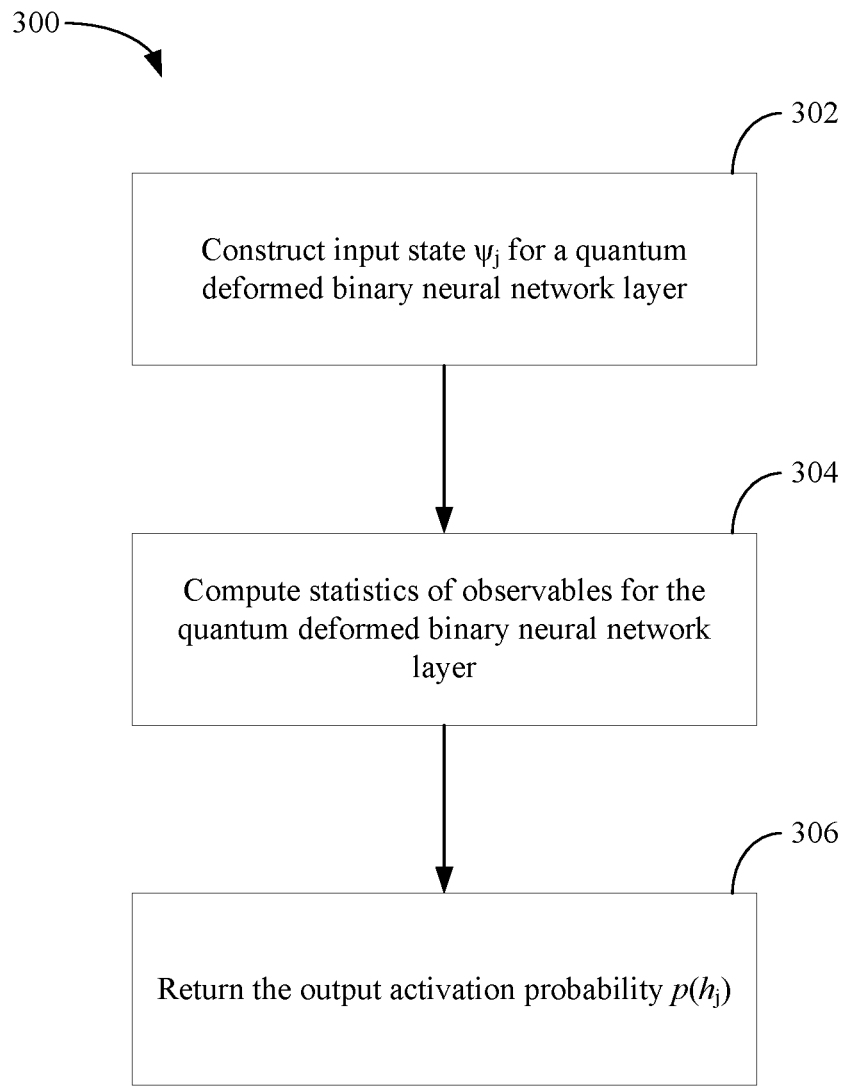
FIG. 3 depicts a method for propagating data between quantum deformed layers.

FIG. 3 depicts a method 300 for propagating data between quantum deformed layers. In particular, method 300 may be used for propagating through a layer given input activation and weight distributions $q_{ij}$, $p_i$, $D_j$, for each layer j=1, . . . , M.

Method 300 beings at step 302 with constructing an input state $\psi_j$ for the jth layer of a quantum deformed neural network. For example, this may be performed using Equation 20, above.

Method 300 then proceeds to step 304 with computing statistics for one or more observables for the layer of the quantum deformed neural network.

In some aspects, the statistics include a mean $\mu$ and variance $\sigma^2$ of observables for the layer. For example, this may be performed according to Equation 24, above.

Method 300 then proceeds to step 306 with returning an output activation probability p(h'$_j$). For example, this may be performed using Equation 22, above.

Quantum Deformation of a Binary Neural Network

Figure 4:
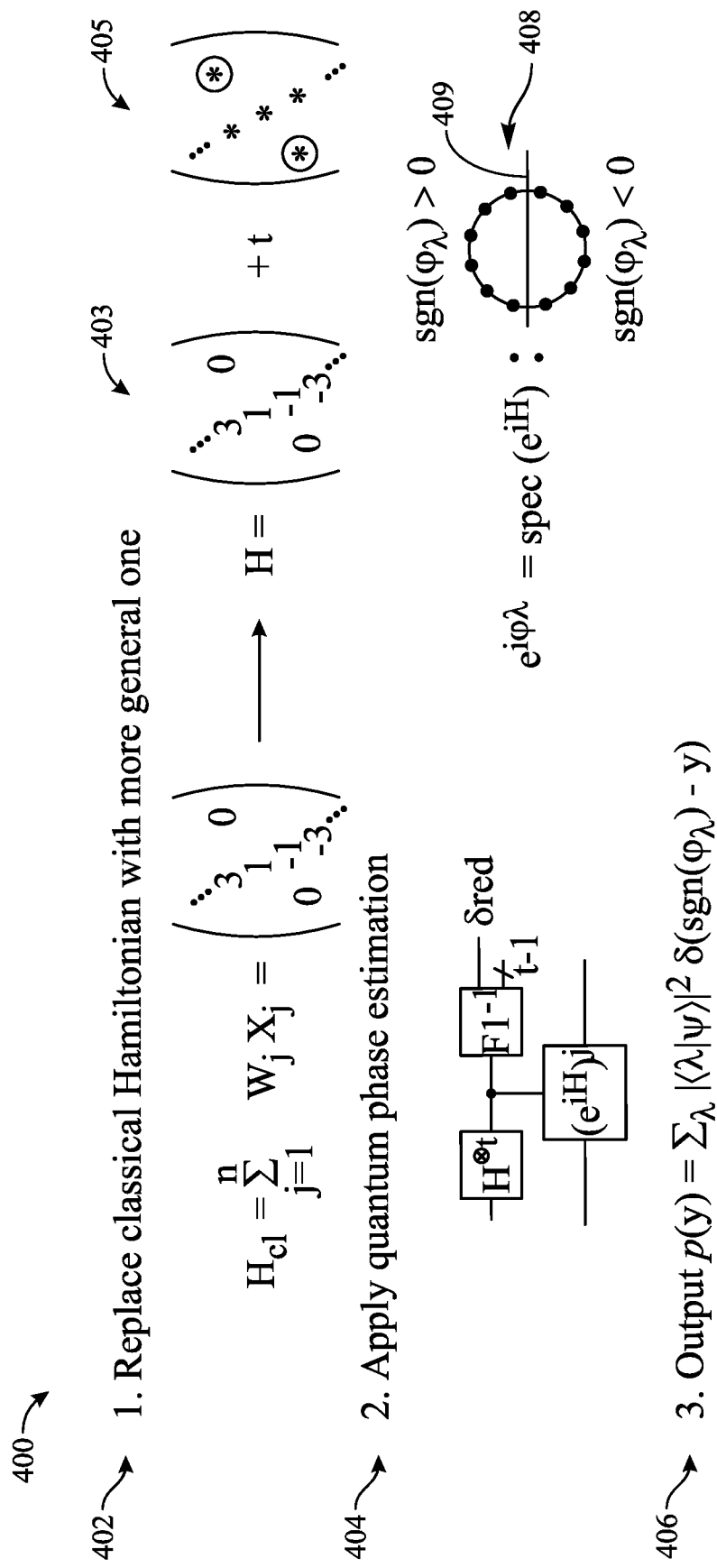
FIG. 4 depicts a process for implementing a quantum deformed binary network.

FIG. 4 depicts a process 400 for implementing a quantum deformed binary network. In the first step 402, the Hamiltonian corresponding to the classical layer $H_{cl}$ is replaced with a generic non-diagonal quantum Hamiltonian H. In general, H may be written as the sum of a classical term 403 corresponding to the classical layer, and a quantum term 405.

In the second step 404, a quantum phase estimation is performed, as described above. Note that the result of this estimation is the eigenvalues are now indexed by the quantum numbers $\lambda$, and due to unitarity, are still distributed around the circle, as depicted at 408. The sign of $\varphi$ may be determined by looking at whether $\varphi$ is above or below the horizontal axis 409.

In the third step 406, a probability p(y) that the random variables $\varphi_\lambda$, has given sign, according to the probability distribution given by the wavefunction $\psi$ is determined.

Example Method for Training Quantum Network

Figure 5:
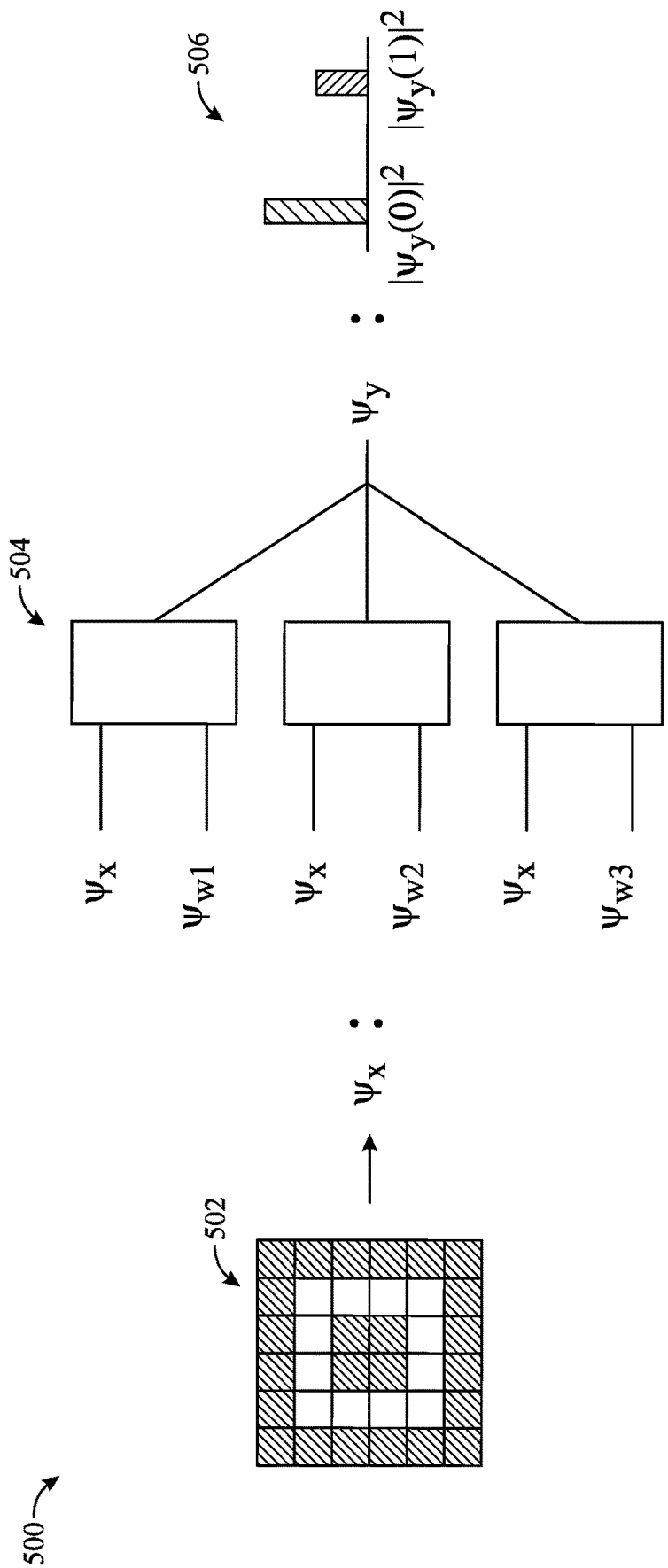
FIG. 5 depicts a process for training a quantum deformed neural network to perform a task.

FIG. 5 depicts a process 500 for training a quantum deformed neural network to perform a task. In this case, the example task is classification of an image input 502.

Figure 6:
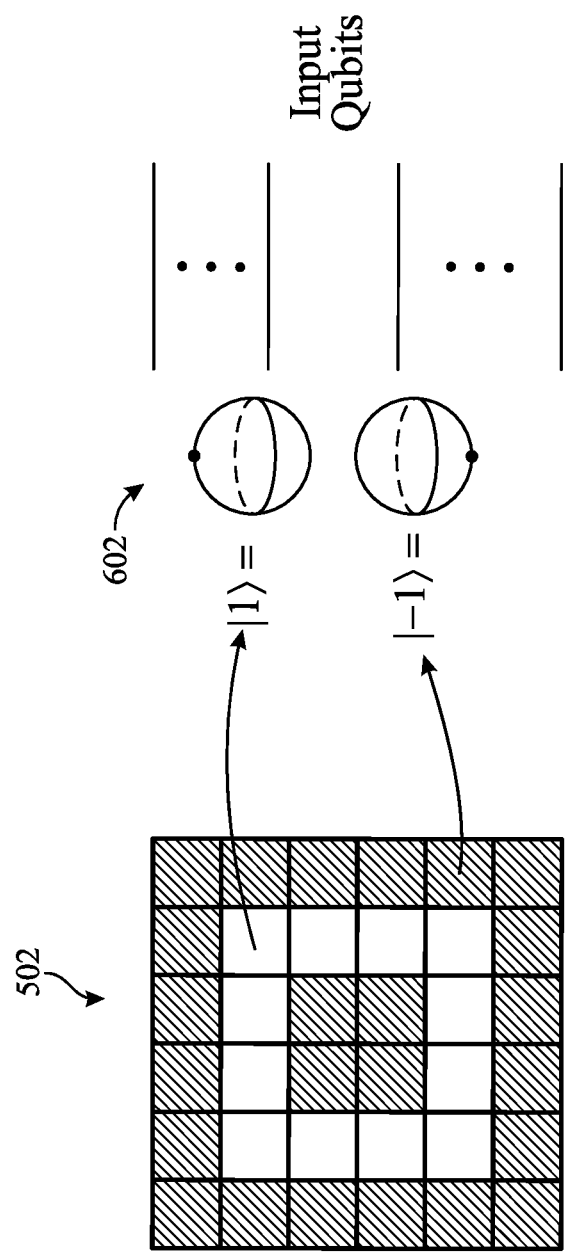
FIG. 6 depicts an example of deriving qubit states from input image data.

First, the input image 502 is transformed into a wave function $\psi_x$, which represents the states of the input qubits based on input image 502. FIG. 6 depicts an example of deriving qubit states 602 (e.g., $|-1\rangle$ and $|1\rangle$) from input image 502. In this example, white pixels are encoded to the +1 state (north pole of the Bloch sphere) and black pixels to −1 state (south pole of the Bloch sphere).

Returning to FIG. 5, the wave function $\psi_x$ is processed by the quantum deformed neural network 504, which generates output class probabilities 506.

Then an optimization method is used to adjust the weights $\psi_{w1} \ldots \psi_{w3}$ in order to minimize a loss, such as the cross-entropy loss between the prediction and the target class. In one example, the optimization method is a backpropagation method.

Example Processing System

Figure 7:
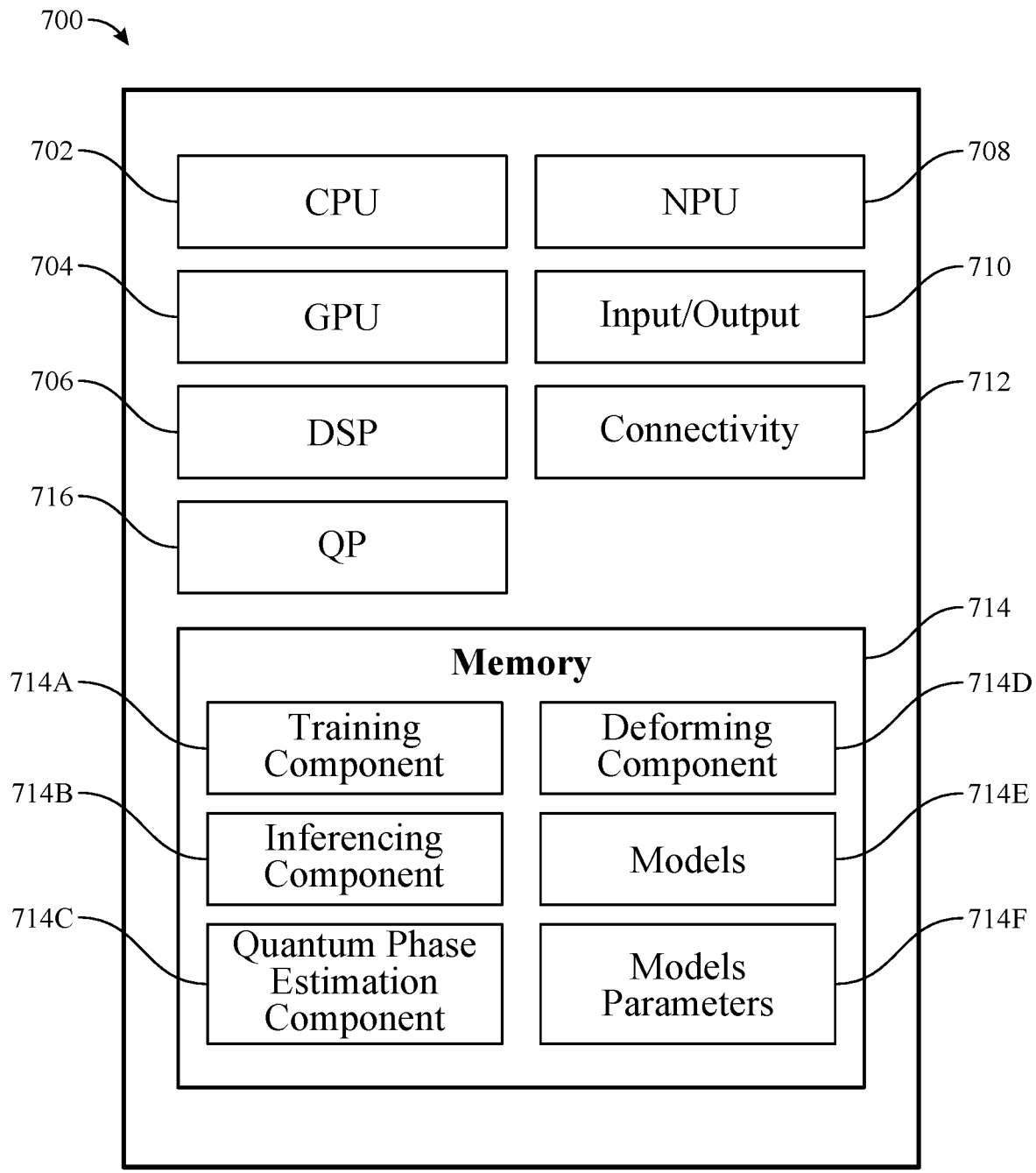
FIG. 7 depicts an example processing system configured to perform the various methods described herein.

FIG. 7 depicts an example processing system 700 configured to perform the various methods described herein, including, for example, with respect to FIGS. 3-5.

Processing system 700 includes a central processing unit (CPU) 702, which in some examples may be a multi-core CPU. Instructions executed at the CPU 702 may be loaded, for example, from a program memory associated with the CPU 702 or may be loaded from memory 714.

Processing system 700 also includes additional processing components tailored to specific functions, such as a graphics processing unit (GPU) 704, a digital signal processor (DSP) 706, a neural processing unit (NPU) 808, and a quantum processor (QP) 716.

An NPU, such as 708, is generally a specialized circuit configured for implementing all the necessary control and arithmetic logic for executing machine learning algorithms, such as algorithms for processing artificial neural networks (ANNs), deep neural networks (DNNs), random forests (RFs), probabilistic numeric convolutional neural networks (PNCNNs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the curating of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 808 is a part of one or more of CPU 702, GPU 704, and/or DSP 706.

In some examples, connectivity component 712 may include various subcomponents, for example, for wide area network (WAN), local area network (LAN), Wi-Fi connectivity, Bluetooth connectivity, and other data transmission standards.

Processing system 700 may also include one or more input and/or output devices 710, such as screens, touch-sensitive surfaces (including touch-sensitive displays), physical buttons, speakers, microphones, and the like.

In some examples, one or more of the processors of processing system 700 may be based on an ARM or RISC-V instruction set.

Processing system 700 also includes memory 714, which is representative of one or more static and/or dynamic memories, such as a dynamic random access memory, a flash-based static memory, and the like. In this example, memory 714 includes computer-executable components, which may be executed by one or more of the aforementioned processors of processing system 700.

In this example, memory 714 includes training component 714A, inferencing component 714B, quantum phase estimation component 714C, deforming component 714D, models 714E, and model parameters 714F. The depicted components, and others not depicted, may be configured to perform various aspects of the methods described herein.

Generally, processing system 700 and/or components thereof may be configured to perform the methods described herein, including methods described with respect to FIGS. 3-5.

Notably, in other embodiments, aspects of processing system 700 may be omitted, and other aspects may be added. Further, various aspects of methods described above may be performed on one or more processing systems.

Example Clauses

Implementation examples are described in the following numbered clauses:

Clause 1: A method for processing data in a quantum deformed binary neural network, comprising: determining an input state for a layer of the quantum deformed binary neural network; computing statistics for one or more observables in the layer; and returning an output activation probability based on the statistics for the one or more observables in the layer.

Clause 2: The method of Clause 1, wherein returning the output activation probability comprises performing a quantum phase estimation.

Clause 3: The method of any one of Clauses 1-2, wherein determining an input state is performed according to $$|\psi_j\rangle = |\psi_H\rangle \otimes |\psi\rangle_{W_{j,:}}, |\psi_H\rangle = \bigotimes_{i=1}^{N}[\sqrt{p_i(h_i = 0)}|0\rangle + \sqrt{p_i(h_i = 1)}|1\rangle],$$

where $|\psi_j\rangle$ is the input state.

Clause 4: The method of any one of Clauses 1-3, wherein: the statistics for the one or more observables in the layer comprise a mean and a variance, and computing the statistics is performed according to $\mu = \langle\psi|DHD^{-1}|\psi\rangle$, $\sigma^2 = \langle\psi|DH^2D^{-1}|\psi\rangle - \mu^2$, where $\mu$ is the mean and $\sigma^2$ is the variance.

Clause 5: The method of any one of Clauses 1-4, wherein returning an output activation probability is performed according to $$\Phi\left(-\frac{2\mu_j - N}{2\sigma_j}\right),$$

where $\Phi$ is a cumulative distribution function of a standard normal distribution.

Clause 6: A method for training a quantum deformed binary neural network, comprising: providing input data to a quantum deformed binary neural network; receiving output data from the quantum deformed binary neural network, wherein the output data comprises a plurality of class probabilities; calculating a loss based on the plurality of class probabilities and a known class of the input data; and optimizing a plurality of quantum weights based on the loss.

Clause 7: The method of Clause 6, wherein the quantum weights comprise quantum wave functions.

Clause 8: The method of any one of Clauses 6-7, wherein the loss comprises a cross-entropy loss.

Clause 9: The method of any one of Clauses 6-8, wherein the input data comprises image data.

Clause 10: A processing system, comprising: a memory comprising computer-executable instructions; and one or more processors configured to execute the computer-executable instructions and cause the processing system to perform a method in accordance with any one of Clauses 1-9.

Clause 11: A processing system, comprising means for performing a method in accordance with any one of Clauses 1-9.

Clause 12: A non-transitory computer-readable medium comprising computer-executable instructions that, when executed by one or more processors of a processing system, cause the processing system to perform a method in accordance with any one of Clauses 1-9.

Clause 13: A computer program product embodied on a computer-readable storage medium comprising code for performing a method in accordance with any one of Clauses 1-9.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for processing data in a quantum deformed binary neural network, comprising:
   determining an input state for a layer of the quantum deformed binary neural network based on input image data, wherein the quantum deformed binary neural network is configured to perform the determining of the input state based on the input image data and a quantum phase estimation;
   computing statistics for one or more observables in the layer, wherein the quantum deformed binary neural network is configured to perform the computing of the statistics based on using a quantum circuit with one or more entangled qubits comprising activation bits and weight bits that are entangled with one another to process the input state;
   returning, by the quantum deformed binary neural network, an output activation probability based on the statistics for the one or more observables in the layer; and assigning a classification to the input image data based on the output activation probability.

2. The method of claim 1, wherein returning the output activation probability comprises performing an additional quantum phase estimation.

3. The method of claim 1, wherein determining the input state is performed according to $$|\psi_j\rangle = |\psi_H\rangle \otimes |\psi\rangle_{W_{j,:}}, \; |\psi_H\rangle = \bigotimes_{i=1}^{N}\left[\sqrt{p_i(h_i=0)}\,|0\rangle + \sqrt{p_i(h_i=1)}\,|1\rangle\right],$$

where $|\psi_j\rangle$ is the input state for the jth layer of the quantum deformed binary neural network, where $p_i$ is an ith probability, where $h_i$ is an ith activation, where H is a Hamiltonian, and where $W_j$ is a jth row of a weight matrix for the quantum deformed binary neural network.

4. The method of claim 1, wherein:
the statistics for the one or more observables in the layer comprise a mean and a variance, and
computing the statistics is performed according to $\mu = \langle\psi|DHD^{-1}|\psi\rangle$, $\sigma^2 = \langle\psi|DH^2D^{-1}|\psi\rangle - \mu^2$, where $\mu$ is the mean and $\sigma^2$ is the variance, where D is the quantum circuit, and where H is a Hamiltonian.

5. The method of claim 1, wherein returning the output activation probability is performed according to $$\Phi\left(-\frac{2\mu_j - N}{2\sigma_j}\right),$$

where $\Phi$ is a cumulative distribution function of a standard normal distribution, where $\mu_j$ is a mean for a jth layer of the quantum deformed binary neural network and $\sigma_j$ is a variance for the jth layer of the quantum deformed binary neural network, and where N is a number of input neurons.

6. A method for training a quantum deformed binary neural network, comprising:
providing input image data to the quantum deformed binary neural network;
receiving output data from the quantum deformed binary neural network, wherein the output data comprises a plurality of class probabilities for the input image data and wherein the quantum deformed binary neural network is configured to generate the output data based on using a quantum circuit with one or more entangled qubits comprising activation bits and weight bits that are entangled with one another to process an input state determined based on the input image data and a quantum phase estimation;
calculating a loss based on the plurality of class probabilities and a known class of the input image data; and
adjusting a plurality of quantum weights of the quantum deformed binary neural network based on the loss.

7. The method of claim 6, wherein the quantum weights comprise quantum wave functions.

8. The method of claim 6, wherein the loss comprises a cross-entropy loss.

9. A processing system, comprising:
at least one memory comprising computer-executable instructions; and
at least one processor configured to execute the computer-executable instructions and cause the processing system to:
determine an input state for a layer of a quantum deformed binary neural network based on input image data, wherein the quantum deformed binary neural network is configured to perform the determining of the input state based on the input image data and a quantum phase estimation;
compute statistics for one or more observables in the layer, wherein the quantum deformed binary neural network is configured to perform the computing of the statistics based on using a quantum circuit with one or more entangled qubits comprising activation bits and weight bits that are entangled with one another to process the input state;
return, by the quantum deformed binary neural network, an output activation probability based on the statistics for the one or more observables in the layer; and
assign a classification to the input image data based on the output activation probability.

10. The processing system of claim 9, wherein to return the output activation probability, the processor is further configured to perform an additional quantum phase estimation.

11. The processing system of claim 9, wherein the processor is further configured to determine the input state according to $|\psi_j\rangle = |\psi_H\rangle \otimes$ $$|\psi\rangle_{W_{j,:}}, \; |\psi_H\rangle = \bigotimes_{i=1}^{N}\left[\sqrt{p_i(h_i=0)}\,|0\rangle + \sqrt{p_i(h_i=1)}\,|1\rangle\right],$$

where $|\psi_j\rangle$ is the input state for the jth layer of the quantum deformed binary neural network, where $p_i$ is an ith probability, where $h_i$ is an ith activation, where H is a Hamiltonian, and where $W_j$ is a jth row of a weight matrix for the quantum deformed binary neural network.

12. The processing system of claim 9, wherein:
the statistics for the one or more observables in the layer comprise a mean and a variance, and
the processor is further configured to compute the statistics according to $\mu = \langle\psi|DHD^{-1}|\psi\rangle$, $\sigma^2 = \langle\psi|DH^2D^{-1}|\psi\rangle - \mu^2$, where $\mu$ is the mean and $\sigma^2$ is the variance, where D is the quantum circuit, and where H is a Hamiltonian.

13. The processing system of claim 9, wherein the processor is further configured to return the output activation probability according to $$\Phi\left(-\frac{2\mu_j - N}{2\sigma_j}\right),$$

where $\Phi$ is a cumulative distribution function of a standard normal distribution, where $\mu_j$ is a mean for a jth layer of the quantum deformed binary neural network and $\sigma_j$ is a variance for the jth layer of the quantum deformed binary neural network, and where N is a number of input neurons.

14. A processing system, comprising:
at least one memory comprising computer-executable instructions; and
at least one processor configured to execute the computer-executable instructions and cause the processing system to:
provide input image data to a quantum deformed binary neural network;
receive output data from the quantum deformed binary neural network, wherein the output data comprises a plurality of class probabilities for the input image data and wherein the quantum deformed binary neural network is configured to generate the output data based on using a quantum circuit with one or more entangled qubits comprising activation bits and weight bits that are entangled with one another to process an input state determined based on the input image data and a quantum phase estimation;

calculate a loss based on the plurality of class probabilities and a known class of the input image data; and adjust a plurality of quantum weights of the quantum deformed binary neural network based on the loss.

15. The processing system of claim 14, wherein the quantum weights comprise quantum wave functions.

16. The processing system of claim 14, wherein the loss comprises a cross-entropy loss.

* * * * *